United States Patent
Fujimoto et al.

(10) Patent No.: US 7,203,583 B2
(45) Date of Patent: Apr. 10, 2007

(54) ELECTRIC POWER STEERING UNIT

(75) Inventors: Chiaki Fujimoto, Tokyo (JP); Kazushi Kimura, Hyogo (JP); Isamu Nagai, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 351 days.

(21) Appl. No.: 10/971,144

(22) Filed: Oct. 25, 2004

(65) Prior Publication Data

US 2005/0269150 A1   Dec. 8, 2005

(30) Foreign Application Priority Data

Jun. 2, 2004   (JP)   ............... 2004-164747

(51) Int. Cl.
*B62D 5/04*   (2006.01)
(52) U.S. Cl. .................. 701/41; 180/443; 180/446
(58) Field of Classification Search ............ 701/41–43; 180/412, 415, 421, 422, 443, 446
See application file for complete search history.

(56) References Cited

U.S. PATENT DOCUMENTS

| | | | |
|---|---|---|---|
| 4,986,379 A * | 1/1991 | Morishita | 180/446 |
| 6,326,753 B1 * | 12/2001 | Someya et al. | 318/471 |
| 6,520,279 B2 * | 2/2003 | Fukumoto et al. | 180/446 |
| 6,860,361 B2 * | 3/2005 | Takatsuka et al. | 180/446 |
| 6,902,028 B2 * | 6/2005 | Takatsuka et al. | 180/446 |
| 7,084,593 B2 * | 8/2006 | Crowley | 318/432 |
| 7,091,686 B2 * | 8/2006 | Kagei | 318/434 |
| 2003/0106737 A1 * | 6/2003 | Itakura | 180/446 |
| 2005/0205344 A1 * | 9/2005 | Uryu | 180/446 |

FOREIGN PATENT DOCUMENTS

| | | |
|---|---|---|
| EP | 0 903 279 A2 | 3/1999 |
| JP | 62-11330 U | 1/1987 |
| JP | 05-034168 | 2/1993 |
| JP | 6-247324 A | 9/1994 |
| JP | 07-137651 | 5/1995 |
| JP | 08-108856 | 4/1996 |
| JP | 09-315330 | 12/1997 |
| JP | 2000-339600 | 12/2000 |
| JP | 2001-138928 A | 5/2001 |
| JP | 2001-138929 | 5/2001 |
| JP | 2001-328551 | 11/2001 |
| JP | 2001-328551 A | 11/2001 |
| JP | P2003-220963 A | 8/2003 |

* cited by examiner

*Primary Examiner*—Gary Chin
(74) *Attorney, Agent, or Firm*—Sughrue Mion, PLLC

(57) ABSTRACT

An electric power steering unit includes: a steering mechanism for steering a wheel under the torque of a steering wheel; a motor for adding a steering assist power to the steering mechanism; a controller for controlling current to be conducted through the motor in accordance with a steering state; a storage element for storing a state of the controller; and initial value setting device for causing the storage device to store a state of the controller when IG (ignition switch) is changed to OFF, and for obtaining a process of overheat state of the controller or the motor to set an initial value of a current limit value to the motor when the IG is changed to ON. As a result, not only a load on a battery when IG is OFF is reduced but also the motor is efficiently driven at the start time.

14 Claims, 6 Drawing Sheets

ELECTRIC POWER STEERING UNIT

BACKGROUND OF THE INVENTION

1. Field of the Invention

The present invention relates to an electric power steering unit of a vehicle provided with an electric motor (simply referred to as motor as well) that provides an assist power to a turning operation of a steering handle and, more particularly, to an electric power steering unit that prevents a motor or an ECU (ELECTRONIC CONTROL UNIT) carrying out a driving control of this motor from being overheated by limiting a current flowing through the motor.

2. Description of the Related Art

As a conventional motor control unit that controls a motor while monitoring the temperature rise of a motor (i.e., electric motor) for use in an electric power steering unit, for example, the Japanese Patent No. 2892899 discloses a motor control unit.

Specifically, in the Japanese Patent No. 2892899, the following "motor control unit" is disclosed. "This motor control unit applies an electric power to a motor in response to the power application operation from outside, and is provided with a control section for setting various control information with respect to the motor. The motor control unit includes: power supply self-hold means for self-holding a power supply to be supplied to this control section; temperature estimating means for estimating an elevated temperature of the motor with a value of current flowing through the motor; interruption time period operation means for operating a time period before interruption of power supply having been self-held based on the elevated temperature having been estimated after the interruption of power supply to the motor; and power supply interruption means for outputting a power supply interruption command to the power supply self-hold means after an interruption time period having been operated has passed."

In this Japanese Patent No. 2892899, it is further described that a power supply of the motor control unit is held and control information having been set in the unit is maintained until an elevated temperature of the motor falls to not more than a permitted value after the interruption of power supply of the motor (electric motor), thereby enabling to achieve the protection from overheat and improvements in restart properties.

In another Japanese Patent No. 3405292, the following "Electric Power Steering Unit of Vehicle" is disclosed. "This electric power steering unit of vehicle includes: an electric motor for providing an assist power to the turning operation of a steering handle; assist current value determination means for determining an assist current value in accordance with a steering state of the steering handle; final assist current value determination means that updates a current limit value so as to make this current limit value smaller when a value indicating a heated state of an electric motor to be updated in accordance with a current-conducting state of the electric motor is larger than a motor current limit determined value, and that limits an assist current value with this current limit value to determine a final assist current value; storage means for storing data without being supplied with an electric power; initial value setting means that causes storage means to store a ratio between a value indicating an overheat state of the electric motor and the maximum value of the above-mentioned motor current limit determined value as data regarding a current limit value when an ignition switch is changed from ON state to OFF state, and that establishes a value corresponding to the data regarding a current limit value having been stored when the ignition switch is changed from OFF state to ON state as an initial value of a value indicating an overheat state of the electric motor; and motor electrification means for conducting current through the electric motor in accordance with a final assist current value."

In a further Japanese Patent No. 3405292, the following techniques are disclosed. That is, when the ignition switch is changed from ON state to OFF state, data regarding a current limit value can be stored without a battery being loaded. Further, the data having been stored is read out and processed when the ignition switch comes to be in ON state next, and this data is established as an initial value of a value indicating an overheat state of the electric motor to be updated in accordance with a current-conducting state of the motor. Therefore, even in the case where once the ignition switch has been changed from ON state to OFF state and thereafter is changed to ON state in a short time period, a current limit value becomes an appropriate value, thereby enabling to prevent a drive circuit or an electric motor from being over-heated.

However, in the motor control unit disclosed in the Japanese Patent No. 2892899 or the electric power steering unit of vehicle disclosed in the Japanese Patent No. 3405292, even after the ignition switch has been changed to be in OFF state, the supply of an electric power from the battery of a vehicle to the electric control unit continues until the elevated temperature of the motor (electric motor) falls to not more than a permitted value.

Consequently, a problem exists in that a load on the battery at the time of the ignition switch being changed from in state to OFF state is large.

Moreover, when the ignition switch is changed from ON state to OFF state with the motor (electric motor) still being at a high temperature, a value indicating an overheat state of the motor is stored in the storage means as data regarding the current limit value.

Accordingly, even when the ignition switch is changed from OFF state to ON state after the temperature of the motor has dropped fully to not more than a permitted value, a value based on the data regarding the current limit value having been stored at the time of the motor being at a high temperature is established as an initial value of a current limit value, and the current corresponding to this initial value flows through the motor.

Thus, even in the case where the OFF state of the ignition switch continues for a long time period, a temperature of the motor has dropped fully and an initial value of the current limit value at the time of bringing the ignition switch in ON can be made larger (that is, in the case where a motor current at the time of bring the ignition switch in ON can be larger), the initial value of the current limit value still remains at a low value having been stored.

In consequence, a further problem exists in that starting characteristic of a motor (electric motor) is restricted, and the motor is not driven efficiently with an appropriate initial value of the current limit value.

SUMMARY OF THE INVENTION

The present invention was made to solve the above-described problems, and has an object of providing an electric power steering unit capable of reducing load on a battery when an ignition switch is changed to OFF state, relieving limits of starting characteristic of a motor, and driving the motor efficiently.

An electric power steering unit according to the invention includes: a steering mechanism for steering a wheel under the steering torque of a steering wheel; a motor for adding a steering assist power to the mentioned steering mechanism; a controller for controlling a current to be conducted through the mentioned motor in accordance with a steering state; storage means for storing a state of the mentioned controller; and initial value setting means for causing the mentioned storage means to store a state of the mentioned controller when an ignition switch is changed from ON state to OFF state, and for obtaining a process of overheat state of the mentioned controller or the mentioned motor based on a state of the controller having been stored in the mentioned storage means and a process state during the mentioned ignition switch being OFF to set an initial value of a current limit value to the mentioned motor when the mentioned ignition switch is changed from OFF state to ON state.

As a result, according to the electric power steering unit of the invention, it is possible to interrupt the supply of an electric power from the battery to the controller even if en elevated temperature has not fallen to not more than a permitted value at the time of the ignition switch being changed to OFF state. Thus, it is possible to diminish a load on the battery when the ignition switch is changed to OFF state.

In addition, according to the electric power steering unit of the invention, it is possible to efficiently drive the motor at an appropriate initial set value of a current limit value even in the case where the ignition switch has once been changed from ON state to OFF state and thereafter is changed to ON state in a short time period, or even in the case where a temperature of the motor has fallen fully to not more than a permitted value and then is changed again from OFF state to ON state.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
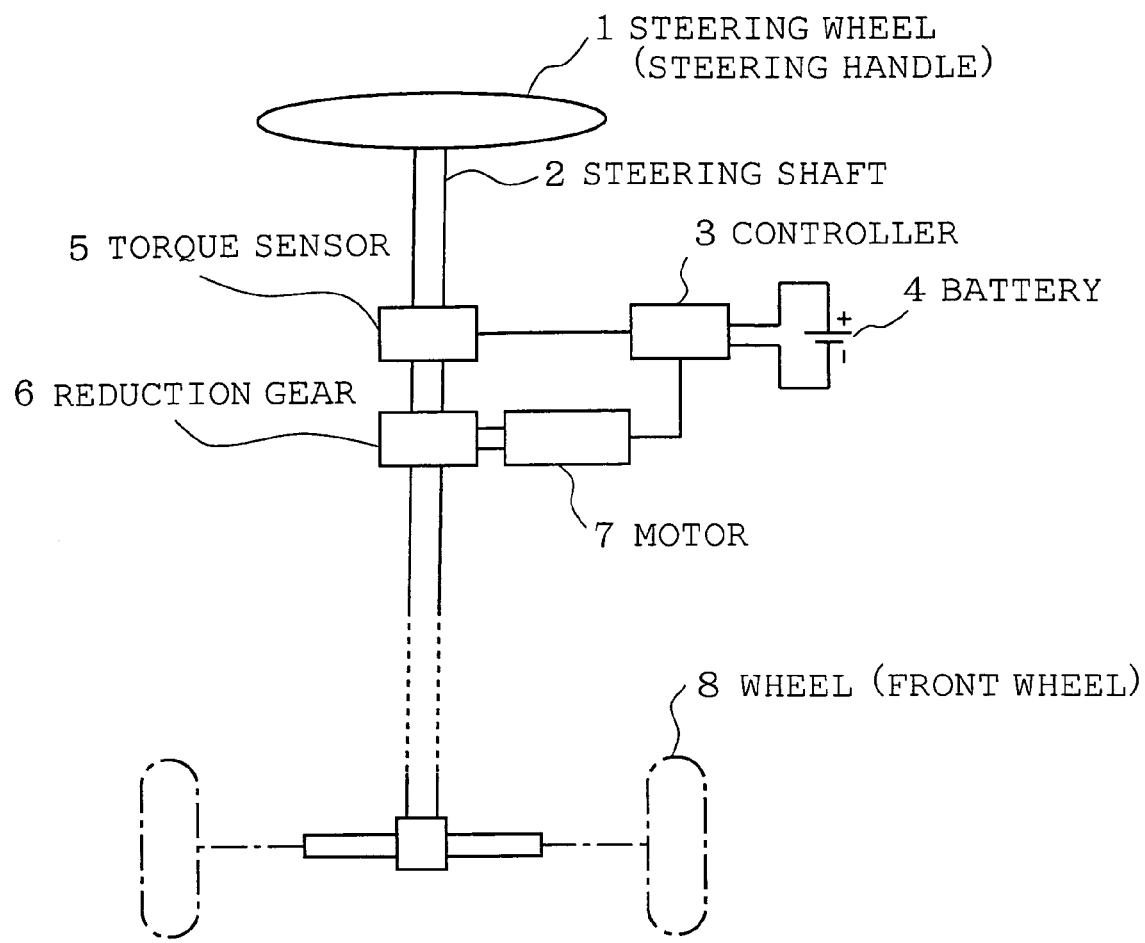
FIG. 1 is a view showing an entire constitution of an electric power steering unit according to a first preferred embodiment of the present invention.

Several preferred embodiments of the present invention are hereinafter described referring to the drawings.

In the drawings, same reference numerals designate same or like parts.

Embodiment 1

FIG. 1 is a view showing an entire constitution of an electric power steering unit according to a first preferred embodiment of the invention.

With reference to FIG. 1, reference numeral 1 designates a steering wheel (steering handle), numeral 2 designates a steering shaft, and numeral 3 designates a controller acting as an ECU (ELECTRONIC CONTROL UNIT) that carries out the drive control of a motor. Numeral 4 designates a battery, numeral 5 designates a torque sensor, and numeral 6 designates a reduction gear. Numeral 7 designates a motor (electric motor), and numeral 8 designates a wheel (front wheel).

The steering wheel (steering handle) 1, the steering shaft 2, the torque sensor 5, the reduction gear 5 and the like form a steering mechanism that steers the wheel (front wheel) 8 under the steering torque of the steering wheel 1.

Figure 2:
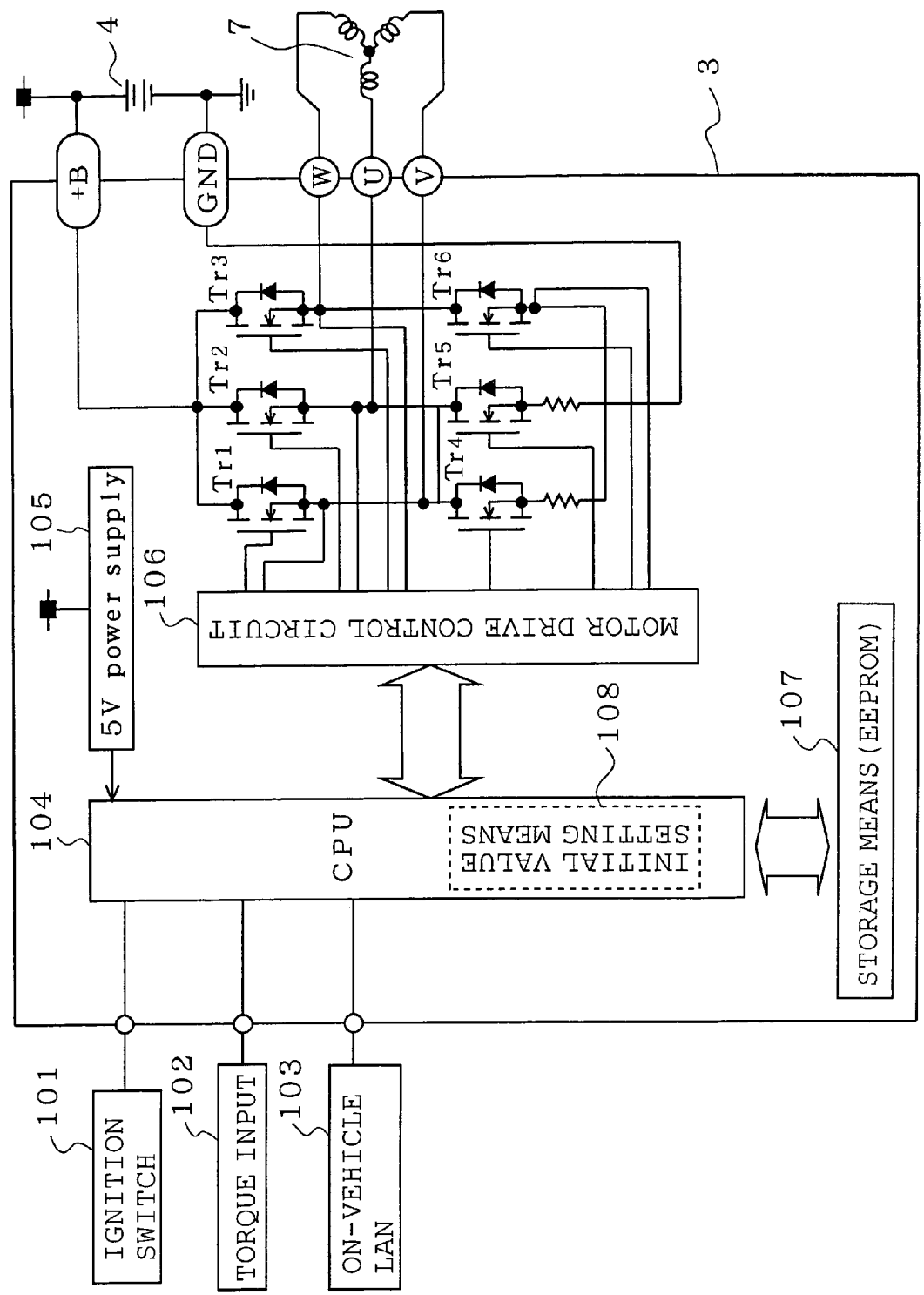
FIG. 2 is a block diagram showing an arrangement of a controller 3 of the electric power steering unit according to the first embodiment.

FIG. 2 is a block diagram showing a constitution of a controller of the electric power steering unit according to the first embodiment shown in FIG. 1.

With reference to FIG. 2, numeral 101 designates an ignition switch, numeral 102 designates a torque to be detected with the torque sensor 5, and numeral 103 designates an on-vehicle LAN. Numeral 104 designates a CPU, numeral 105 designates a 5V power supply that provides a power supply of 5V to the CPU 104, and numeral 106 designates a motor drive control circuit.

Numeral 107 designates an EEPROM (electrically erasable and programmable read only memory that is a programmable ROM capable of being electrically erased) acting as storage means for storing a state of the controller 3. As described later, in this storage means (EEPROM) 107, a current limit value that applies current limits to a motor current in accordance with a steering state, an integrated value of current having been conducted through the motor 7 in accordance with a steering state, and an average value of currents having been conducted through the motor 7 in accordance with a steering state, are stored as states of the controller 3.

In addition, the storage means (EEPROM) 107 stores the states of the controller 3 without being supplied with an electric power.

It is preferable that storage means is not only EEPROM but also a static RAM or flash memory, and that any medium is employed as this storage means as far as being capable of performing the storage with an ignition being temporarily OFF.

Further, numeral 108 designates initial setting means integrated in the CPU 104.

As described later, this initial value setting means 108 causes the storage means (EEPROM) 107 to store the state of the controller 3 when the ignition switch is changed from ON state to OFF state; and obtains a process of overheat state of the controller 3 or the motor 7 based on the state of the controller 3 having been stored in the storage means (EEPROM) 107 and a process state during the ignition switch 101 being OFF (for example, an elapsed time period during the ignition switch 101 being OFF), and sets an initial value of a current limit value to the motor 7 when the ignition switch 101 is changed from OFF state to ON state.

In addition, Tr1 to Tr6 designate switching elements performing an ON/OFF control of current to be conducted through the motor 5 by means of a motor drive control circuit 106.

Figure 3:
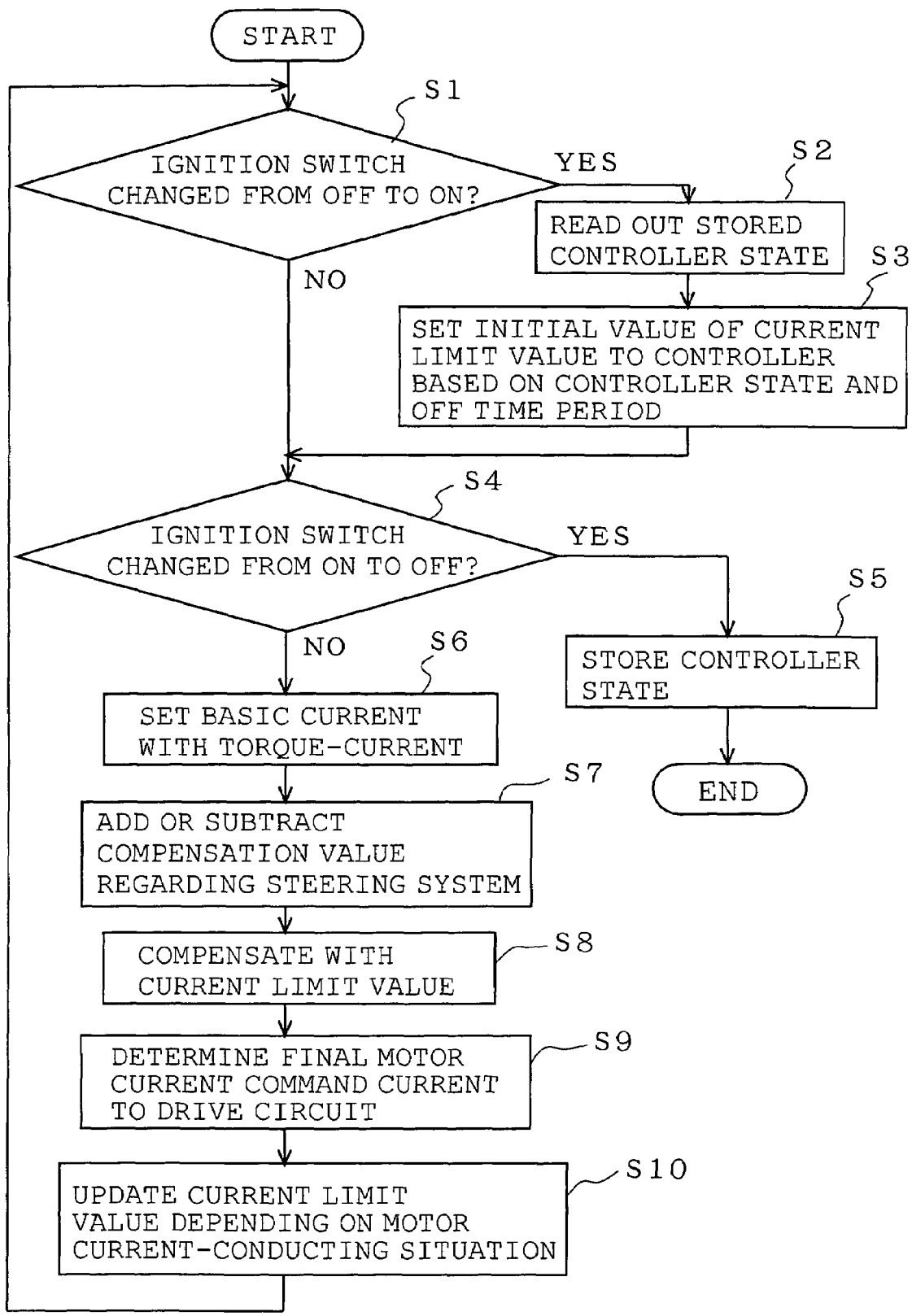
FIG. 3 is a flowchart for explaining operation of the electric power steering unit according to the first embodiment.

FIG. 3 is an explanatory flowchart of operations of the electric power steering unit according to this first embodiment.

With reference to FIG. 3, the operations of the electric power steering unit according to the first embodiment are described.

For starting the electric power steering unit, first in Processing Step S1, it is determined whether or not the ignition switch 101 is changed from OFF state to ON state.

Then, in the case where a result of determination is YES (that is, the ignition switch 1 is in ON state), a state of the controller 3, which the storage means (EEROM) 107 stores, is read out in Processing Step S2. Subsequently in Processing Step S3, an initial value of a current limit value in accordance with an overheat state of the motor 7 is set based on a state of the controller 3 having been read out and a process state during the ignition switch 101 being OFF.

In the case where a result of the determination of whether or not the ignition switch 101 is changed from OFF state to ON state is NO (that is, the ignition switch 101 is in OFF state) in Processing Step S1, the program proceeds to the subsequent Processing Step S4.

Processing Step S4 is the processing at the time when the operation of the electric power steering unit is stopped. In Processing Step S4, it is determined whether or not the ignition switch 101 is changed from ON state to OFF state. In the case where a determination result is YES (that is, the ignition switch 101 is in OFF state), the electric power steering unit is determined stopping.

Then, in Processing Step S5, a state of the controller 3 is written in storage means (EEPROM) 107, and the electric power steering unit is stopped.

In Processing Step S4, in the case where a result of the determination of whether or not the ignition switch 101 is changed from ON state to OFF state is NO (that is, the ignition switch 101 is in the ON state), the program goes to the operations to act as an electric power steering unit from Processing Step S6 onward.

Figure 4:
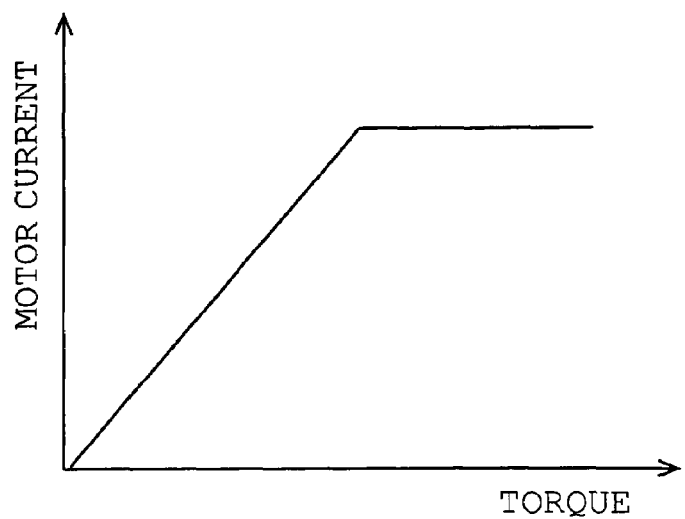
FIG. 4 is a graphic diagram showing a basic relation between a torque (steering torque) and a motor current of the electric power steering unit according to the first embodiment.

FIG. 4 is a graphic diagram showing basic relation between a torque (i.e., steering torque) and a motor current when the electric power steering unit is in operation.

Basic characteristics of a motor current value relative to a torque (steering torque) of the electric power steering unit are preliminarily determined as shown in FIG. 4.

Accordingly, in Processing Step S6, a basic current value of the motor 7 corresponding to a steering torque is fetched out. In Processing Step S7, addition or subtraction of a compensation amount is carried out to and from a basic current value in order to compensate, e.g., loss in the steering system, and a target current value It to be actually conducted through the motor 7 is determined.

In this case, there is a possibility that some usage states of the electric power steering unit such as the repetition of "stationary steering" lead to burnout of the controller 3 or the motor 7.

Additionally, "stationary steering" is steering in the state that a vehicle is stopped. Such a steering causes current flowing through the motor 7 to be the largest, and heat generation of the motor comes to be the maximum.

Accordingly, in Processing Step S8, limit of a current limit value that is determined depending on an overheat state of the power steering system is applied to a target current value It, and a final motor current value If is determined. Further, the CPU 104 outputs a command to the motor drive control circuit 106.

The motor 7 is driven by the motor drive control circuit 106, and performs the steering assist.

Furthermore, as shown in Processing Step S10, a current limit value is updated in accordance with a situation of current being conducted to the motor 7.

As described above, an electric power steering unit comprises: a steering mechanism for steering a wheel under the steering torque of a steering wheel 8; a motor 7 for adding a steering assist power to the steering mechanism; a controller 3 for controlling a current to be conducted through the motor 7 in accordance with a steering state; storage means (EEPROM) 107 for storing a state of the controller 3; and initial value setting means 108 for causing the storage means 107 to store a state of the controller 3 when an ignition switch 101 is changed from ON state to OFF state, and for obtaining a process of overheat state of the controller 3 or the motor 7 based on a state of the controller having been stored in the storage means (EEPROM) 107 and a process state during the ignition switch 10 being OFF to set an initial value of a current limit value to the motor 7 when the ignition switch is changed from OFF state to ON state.

As described above, according to the electric power steering unit, in the case where the ignition switch 101 is changed from ON state to OFF state, a state of the controller 3 is written in the storage means 107 to stop the electric power steering unit.

As a result, it is possible to interrupt the supply of an electric power from the battery of a vehicle to the ECU carrying out the drive control (i.e., the controller 3) even if en elevated temperature has not fallen to not more than a permitted value. Consequently, it is possible to diminish a load on the battery upon the ignition switch being changed to OFF state.

Further, when the ignition switch 101 is changed from OFF state to ON state, data, which the storage means 107 has stored, is read out and processed, and this data is established as an initial value of a current limit value to be updated in accordance with an overheat state.

As a result, it is possible to bring the motor in operation at an appropriate initial set value of a current limit value even in the case where the ignition switch 101 has once been changed from ON state to OFF state and thereafter is changed to ON state in a short time period, or even in the case where a temperature of the motor 7 has fallen fully to not more than a permitted value and then the ignition switch 101 is changed from OFF state to ON state again. Consequently, it is possible to efficiently drive the motor.

Embodiment 2

In this second embodiment, a specific example of "state of the controller" that is stored in storage means (EEPROM) 107 when the ignition switch 101 is changed from ON state to OFF state is described.

It is preferable that data stored in the storage means (EEPROM) 107 (that is, a state of the controller) is, for example, a current limit value at the time of the ignition switch 101 being changed from ON state to OFF state.

This current limit value is written in the storage means (EEPROM) 107 at the time of the ignition switch 101 being changed from ON state to OFF state.

Thereafter, when the ignition switch 101 is changed to ON state, initial value setting means 108 obtains a process of overheat state of the controller 3 or the motor 7 based on a current limit value, being a state of the controller having been stored in the storage means (EEPROM) 107, and a process state during the ignition switch 101 being OFF to set an initial value of a current limit value to the motor 7.

It is also is preferable that data stored in storage means (EEPROM) 107 is, for example, an integrated value of a motor current having been conducted through the motor 7 in accordance with a steering state.

Since a heat dissipation occurs actually, even if motor currents are integrated, when a small quantity of heat is generated at the motor 7, a motor temperature is not elevated, resulting in the state of heat balance.

Accordingly, a predetermined value of a motor current is set (for example, a constant current value capable of keeping the heat balance). When a motor current exceeds this predetermined value having been set, the addition or subtraction of a motor current is carried out, and an integrated value of a motor current having been added or subtracted is written in the storage means (EEPROM) 107 at the time of the ignition switch 101 being changed from ON state to OFF state.

Then, when the ignition switch 101 is changed to ON state thereafter, a process of overheat state of the controller 3 or the motor 7 is obtained based on an integrated value that is stored in the storage means (EEPROM) 107 and a process state during the ignition switch 101 being OFF (for example, OFF time period), and an initial value of a current limit value is set to the motor 7.

It is preferable that an average value of motor currents having been conducted is obtained, and this current average value is established as "state of the controller".

In this case, when the ignition switch 101 is changed from ON state to OFF state, an average value of motor currents is written in the storage means (EEPROM) 107 as "state of the controller".

Then, when the ignition switch 101 is changed to ON state thereafter, a process of overheat state of the controller 3 or the motor 7 is obtained based on a current average value of motor currents that is stored in the storage means (EEPROM) 107 and a process state during the ignition switch 101 being OFF (for example, OFF time period), and an initial value of a current limit value is set to the motor 7.

Further, it is preferable that a temperature data of remarkable heating portions in an internal part of the controller 3 (for example, in the vicinity of the switching elements Tr1 to Tr6 of a motor drive portion) is established as "state of the controller".

In this case, when the ignition switch 101 is changed from ON state to OFF state, a temperature data of remarkable heating portions in an internal part of the controller 3 is written in the storage means (EEPROM) 107 as "state of the controller".

Then, a process of overheat state of the controller 3 or the motor 7 is obtained based on a temperature data that is stored in the storage means (EEPROM) 107 and a process state during the ignition switch 101 being OFF (for example, OFF time period), and an initial value of a current limit value is set to the motor 7.

Embodiment 3

In this third embodiment, a manner of specifically detecting "process state" during the ignition switch 101 being OFF is described.

For example, it is preferable that "process state" during the ignition switch 101 being OFF is an elapsed time period of the ignition switch 101 being in OFF state.

In this case, an elapsed time period of the ignition switch 101 being in OFF state can be obtained as follows. When a time T1 (first time) at the time of the ignition switch 101 being changed from ON state to OFF state is stored in storage means (EEPROM) 107 and, thereafter, a time at the time of the ignition switch 101 being changed to ON state is T2 (a second time), an elapsed time period $\Delta T3$ of the ignition switch being in OFF state can be obtained by the expression of $\Delta T3 = T2 - T1$.

In this case, "process state" during the ignition switch 101 being OFF is an elapsed time period of the ignition switch being in OFF state that is determined between the first time T1 at the time of the ignition switch 101 being changed from ON state to OFF state and the second time T2 at the time of the ignition switch 101 being changed from OFF state to ON state.

Figure 5:
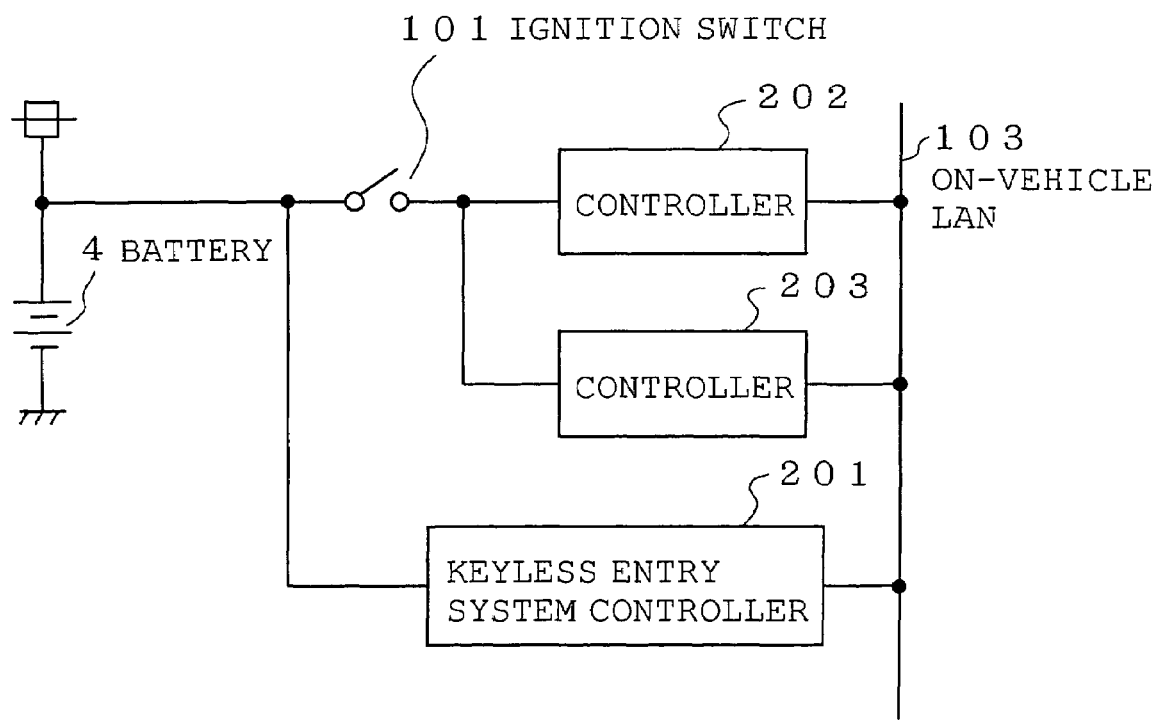
FIG. 5 is a block diagram showing a wiring of the controller in a vehicle.

In addition, FIG. 5 is a wiring block diagram showing the layout of various controllers in a vehicle.

With reference to FIG. 5, numeral 201 designates a controller (keyless entry system controller) for devices still in operation even if the ignition switch 101 is turned off (keyless entry system). Further, numerals 202 and 203 designate controllers coming to stop the operation when the ignition switch 101 is turned off.

The above-described time T1 (the first time) and time T2 (the second time) can also be obtained from the keyless entry system controller 201 in operation despite the ignition switch being OFF.

Then, the foregoing time data can be transmitted to the controller 3, shown in FIG. 2, from the keyless entry system controller 201 with the use of an on-vehicle LAN 103.

In addition, the devices still being in operation even if the ignition switch 101 is OFF include audio, clock, gateway controller, server controller, and the like.

It is also preferable that these time data are obtained with GPS signals for use in navigation system. It is likewise preferable that these time data are obtained from signals of a radio clock.

In the case of obtaining time data from GPS signals or radio clock signals, these signals having been received are inputted on a steady basis to the CPU 104 via the on-vehicle LAN 104, and it is arranged such that times of the ignition switch 101 being ON or OFF are detected by the foregoing CPU 104.

Embodiment 4

According to the foregoing embodiment, as a process state during the ignition switch 101 being OFF, an elapsed time period of the ignition switch being in OFF state is calculated. This elapsed time period is calculated by first obtaining the first time T1 at the time of the ignition switch 101 being changed from ON state to OFF state, and the second time T2 at the time of the ignition switch 101 being changed from OFF state to ON state, and is determined between these first time T1 and second time T2.

On the other hand, according to this fourth embodiment, a time period from the moment of the ignition switch 101 being changed from ON state to OFF state, to the moment of the ignition switch 101 being changed to ON state thereafter is directly measured.

Specifically, a capacitor is preliminarily disposed to store an electric charge upon turning ON of the ignition switch 101 and discharge upon turning OFF of the ignition switch 101.

That is, the capacitor is disposed so as to charge at the time of the ignition switch 101 being in ON state and to start the discharge when the ignition switch 101 comes to be in OFF state.

Figure 6:
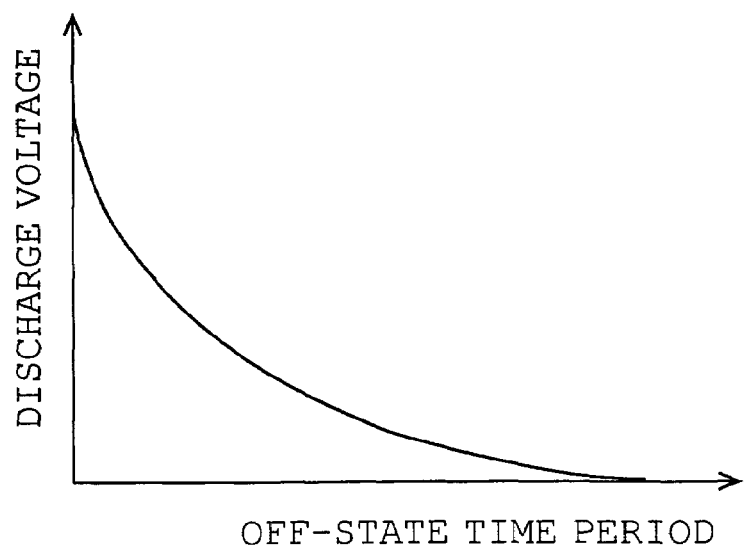
FIG. 6 is a graphic diagram indicating a relation between a discharge voltage of a capacitor and a time period in OFF state.

A discharge voltage of the capacitor decreases as an OFF time period of the ignition switch 101 elapses as shown in FIG. 6.

Accordingly, it is possible to measure a time period of the ignition switch 101 being OFF by measuring this discharge voltage.

Curves of the discharge voltage being decreased vary depending on a capacity of the capacitor. Thus, it is preferable that a capacity of the capacitor is set to such a value that a time period of the steering system being cooled can be measured.

It is preferable that an elapsed time period of the ignition switch being in OFF state, being a process state during the ignition switch. 101 being OFF, is estimated as follows.

First, measured is a difference between a temperature data TH at a place where heat is generated most within the electric power steering unit, for example, in the vicinity of the switching elements Tr1 to Tr6 of the motor drive portion (i.e., temperature data of the portions at a high temperature), and a temperature TL at a place where much heat is not generated, for example, in the vicinity of the elements being less densely packed (i.e., ambient temperature).

Figure 7:
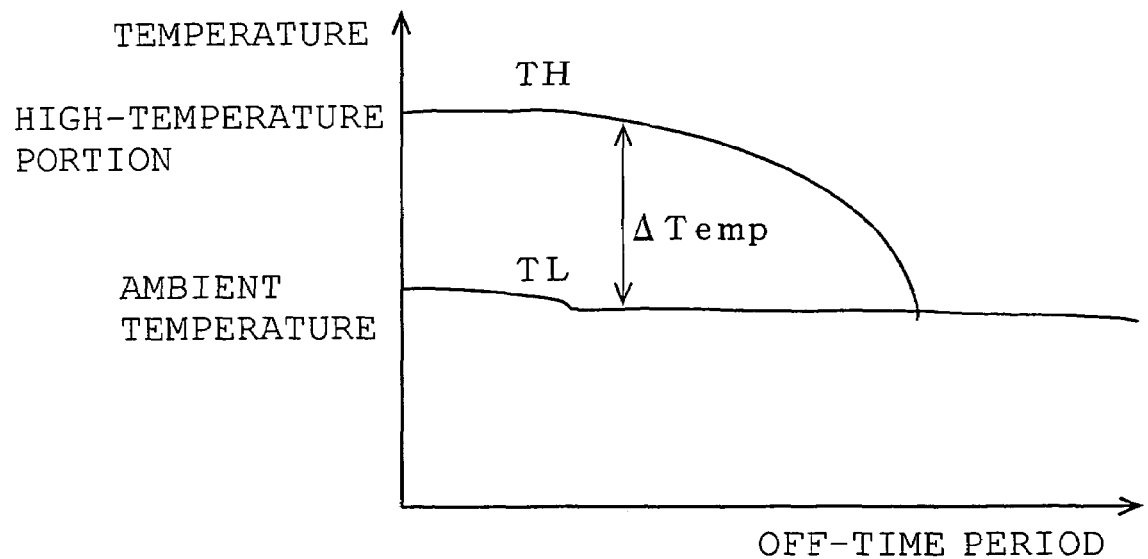
FIG. 7 is a graphic diagram indicating a condition of temperature change in an electric power steering unit according to a fourth embodiment.

FIG. 7 shows the change in these temperatures. When the ignition switch 101 comes to be in OFF state, factors of heat generation are eliminated. Therefore, TH starts to decrease and approaches values of TL.

Accordingly, a difference ΔTemp between TH and TL is obtained, and with this difference (ΔTemp), a time period during the ignition switch 101 being in OFF state can be estimated.

In addition, it is preferable that portions of which temperature is measured are not only internal parts of the controller 3, but also any portion involved in the electric power steering unit, e.g., the motor 7.

Embodiment 5

Degrees of the electric power steering unit being cooled are changed depending on an ambient temperature during the ignition switch 101 being in OFF state. Therefore, it is necessary for initial value setting means to compensate an initial value of a current limit value with respect to the motor 7 in accordance with an ambient temperature.

Accordingly, in this fifth embodiment, a coefficient Ktemp changing in accordance with an ambient temperature is set.

For example, preliminarily Ktmp at a room temperature is set to be 100% (i.e., Ktmp=100%), and Ktmp at a low temperature is set to be <100% (i.e., Ktmp<100%), and Ktmp at a high temperature is set to be >100% (i.e., Ktmp>100%).

Then, a time period of the ignition switch 101 being in OFF state is multiplied by the above-mentioned coefficient Ktmp to obtain a time period of OFF state, whereby it becomes possible to compensate the influence of the ambient temperature.

This ambient temperature may be thought to be the following temperature having been stored. That is, the stored temperature is the one at which the ignition switch 101 is changed from OFF state to ON state, or the one at which the ignition switch 101 is changed from ON state to OFF state.

It is also preferable to use a difference between an ambient temperature when the ignition switch 101 is changed from ON state to OFF state, and an ambient temperature when the ignition switch 101 is changed from OFF state to ON state.

Embodiment 6

The method of determining an initial value of initial value setting means is described taking as an example the case where a current average value is stored as a state of the controller having been stored.

It is possible to obtain an initial value from a relation of primary expression with a time period of the ignition switch 101 being in OFF state during which a stored current average value is measured.

Figure 8:
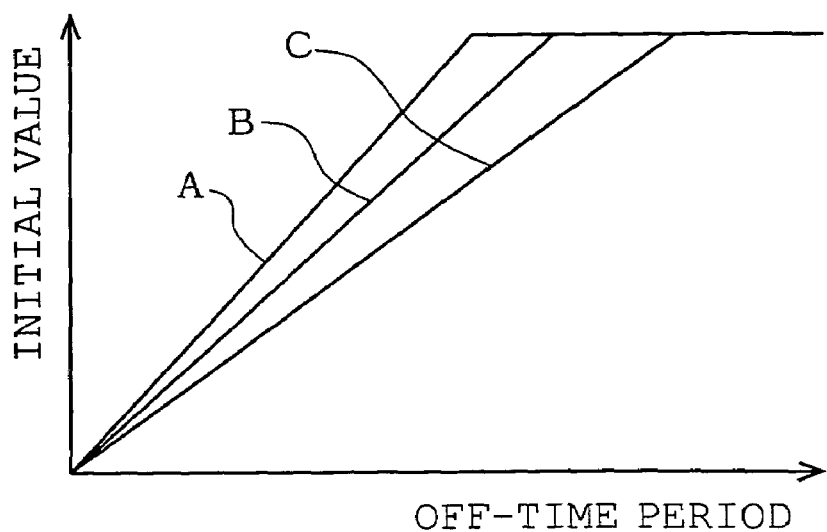
FIG. 8 is a graphic diagram in the case of indicating a relation between a time period of an ignition switch being in OFF state and an initial value in the form of a primary expression in an electric power steering unit according to a sixth embodiment.

FIG. 8 shows a relation between a time period of the ignition switch 101 being in OFF state and an initial value set by initial setting means in the form of primary expression.

A graph of primary expression is obtained from a current average value having been stored, and an initial value of axis of ordinates can be obtained from a time period being in OFF state of axis of abscissas.

Figure 9:
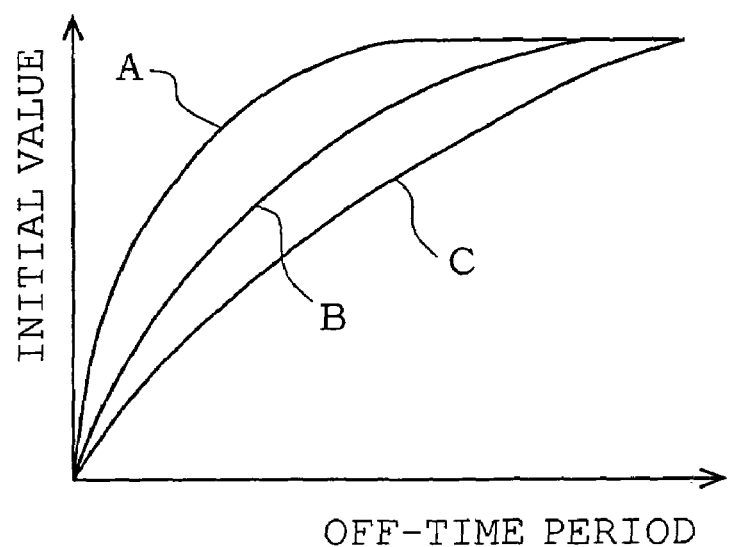
FIG. 9 is a chart in the case of indicating a relation between a time period of an ignition switch being in OFF state and an initial value in the form of an exponential function in the electric power steering unit according to the sixth embodiment.

Furthermore, FIG. 9 shows a relation between a time period of the ignition switch 101 being in OFF state and an initial value set by initial setting means in the form of a graph having a first-order lag.

A graph having a first-order lag is obtained from a stored current average value, and an initial value of axis of ordinates can be obtained from a time period being in OFF state of axis of abscissas.

With the use of the graph having a first-order lag, a more substantive initial value of a current limit value can be set.

However, operations of obtaining a graph from a current average value having been stored and then obtaining an initial value of a limit value require a CPU load to a certain extent. Therefore, in the case where the CPU load is no ignorable, it is preferable that the relation between an elapsed time period during the ignition switch 101 being in OFF state and an initial value of a current limit value has been preliminarily arranged in a table, and using this table initial value setting means sets an initial value.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An electric power steering unit comprising:
   a steering mechanism for steering a wheel under the steering torque of a steering wheel;

a motor for adding a steering assist power to said steering mechanism;

a controller for controlling a current to be conducted through said motor in accordance with a steering state;

storage means for storing a state of said controller; and initial value setting means for causing said storage means to store a state of said controller when an ignition switch is changed from ON state to OFF state, and for obtaining a process of overheat state of said controller or said motor based on said state of the controller having been stored in said storage means and a process state during said ignition switch being OFF to set an initial value of a current limit value to said motor when said ignition switch is changed from OFF state to ON state.

2. The electric power steering unit according to claim 1, wherein said state of the controller, which said storage means stores, is a current limit value applying a current limit to a motor current in accordance with a steering state.

3. The electric power steering unit according to claim 1, wherein said state of the controller, which said storage means stores, is an integrated value of current having been conducted through said motor in accordance with a steering state.

4. The electric power steering unit according to claim 1, wherein said state of the controller, which said storage means stores, is an average value of currents having been conducted through said motor in accordance with a steering state.

5. The electric power steering unit according to claim 1, wherein said process state is an elapsed time period of said ignition switch being in OFF state that is determined between a first time when said ignition switch is changed from ON state to OFF state and a second time when said ignition switch is changed from OFF state to ON state.

6. The electric power steering unit according to claim 5, wherein said first time and said second time are obtained from devices still operating even if said ignition switch is in OFF state.

7. The electric power steering unit according to claim 6, wherein said first time and said second time are obtained from a GPS signal for use in a navigation system.

8. The electric power steering unit according to claim 6, wherein said first time and said second time are obtained from a signal for use in a radio clock.

9. The electric power steering unit according to claim 1, wherein said process state is a time period during said ignition switch being in OFF state.

10. The electric power steering unit according to claim 9, wherein said time period during said ignition switch being in OFF state is determined by having charged a capacitor when said ignition switch is in ON state, causing the capacitor to discharge in OFF state of said ignition switch, and measuring a discharge voltage.

11. The electric power steering unit according to claim 1, wherein said initial value setting means compensates said initial value of said current limit value to said motor depending on an ambient temperature during OFF state.

12. The electric power steering unit according to claim 5, wherein said initial value setting means obtains a relation between said elapsed time period of said ignition switch being in OFF state and said initial value of said current limit value to said motor with a primary expression.

13. The electric power steering unit according to claim 5, wherein said initial value setting means obtains a relation between said elapsed time period of said ignition switch being in OFF state and said initial value of said current limit value to said motor with an exponential function.

14. The electric power steering unit according to claim 5, wherein said initial value setting means arranges preliminarily a relation between said elapsed time period of said ignition switch being in OFF state and said initial value of said current limit value to said motor in a table.

* * * * *